(12) United States Patent
Liu et al.

(10) Patent No.: US 11,850,654 B2
(45) Date of Patent: Dec. 26, 2023

(54) SELF-PIERCING RIVETING WITH BARRIER LAYER

(71) Applicant: Magnesium Products of America Inc., Eaton Rapids, MI (US)

(72) Inventors: Yuchao Liu, London (CA); Jonathan Patrick Weiler, London (CA); Gerry Wang, London (CA)

(73) Assignee: MAGNESIUM PRODUCTS OF AMERICA INC., Eaton Rapids, MI (US)

( * ) Notice: Subject to any disclaimer, the term of this patent is extended or adjusted under 35 U.S.C. 154(b) by 0 days.

(21) Appl. No.: 17/731,993

(22) Filed: Apr. 28, 2022

(65) Prior Publication Data
US 2022/0347738 A1 Nov. 3, 2022

Related U.S. Application Data

(60) Provisional application No. 63/180,764, filed on Apr. 28, 2021.

(51) Int. Cl.
*B21J 15/02* (2006.01)
*B21J 15/30* (2006.01)

(52) U.S. Cl.
CPC ............ *B21J 15/025* (2013.01); *B21J 15/30* (2013.01)

(58) Field of Classification Search
CPC ................................. B21J 15/025; B21J 15/30
See application file for complete search history.

(56) References Cited

U.S. PATENT DOCUMENTS

| 8,739,388 B2* | 6/2014 | Campbell ............... B29C 66/41 29/521 |
| 2013/0273312 A1 | 10/2013 | Campbell et al. |
| 2016/0245323 A1* | 8/2016 | Freis .......................... F16B 5/04 |
| 2018/0058488 A1* | 3/2018 | Wissling ................... F16B 5/04 |
| 2019/0105700 A1* | 4/2019 | Jimbo ................... C22C 38/002 |
| 2020/0072265 A1* | 3/2020 | Wang ...................... C22C 21/06 |

FOREIGN PATENT DOCUMENTS

| DE | 19701150.5 A1 | 7/1998 |
| DE | 10 2011 114 306 A1 | 3/2013 |
| DE | 10 2016 200 533 A1 | 7/2017 |

OTHER PUBLICATIONS

International Search Report and Written Opinion on PCT PCT/US2022/026753 dated Jul. 29, 2022 (8 pages).

* cited by examiner

*Primary Examiner* — Ryan J. Walters
(74) *Attorney, Agent, or Firm* — FOLEY & LARDNER LLP (57) ABSTRACT

A self-piercing riveting (SPR) system includes a top sheet and a bottom sheet. The top sheet is layered above the bottom sheet and are disposed between a die and a blank holder. The SPR system further includes a barrier disposed between the bottom sheet and the die, wherein the barrier is configured to reduce stress concentrations during formation of a joint between the top sheet and the bottom sheet. The barrier may has a thickness between 0.8 mm and 1.0 mm and is made from a cold formed or a dual phase steel alloy.

15 Claims, 8 Drawing Sheets

SELF-PIERCING RIVETING WITH BARRIER LAYER

CROSS-REFERENCE TO RELATED PATENT APPLICATIONS

This application claims the benefit of and priority to U.S. Provisional Patent Application No. 63/180,764, filed Apr. 28, 2021, the entire disclosure of which is hereby incorporated by reference herein.

BACKGROUND

The present disclosure relates to self-piercing riveting technologies and, more specifically, to SPR using a barrier layer.

Self-pierce (or self-piercing) riveting (SPR) is a high-speed mechanical fastening process for joining two or more sheets of material without a predrilled or punched hole. Typically, SPR processes are conducted by driving a semi-tubular rivet through top layers of material and upsetting the rivet in a lower layer (without completely piercing the lower layer) to form a durable mechanical joint. Attempts have been made to use existing SPR technologies to fasten a top layer and bottom layer having different mechanical properties (e.g., an aluminum or steel top layer and a magnesium bottom layer). This rivet structure has suffered from limited integrity due to various failure methods, including cracking of the less ductile layer. In addition, when one or more of the layers is pre-coated (e.g., using electrophoretic coating or with a powder coat), the coating may be damaged when forming the buttons on the die. Thus, while various alloy die castings offer the potential for weight reduction in automotive technologies, the mechanical properties of the alloys may limit use in SPR processes.

It would be advantageous to provide a method and system for self-piercing rivet (SPR) applications that overcomes the foregoing challenges. These and other advantageous features will be apparent to those reviewing the present disclosure.

SUMMARY

One aspect of the present disclosure relates to a self-piercing riveting (SPR) system. The SPR system includes a top sheet and a bottom sheet, and a barrier disposed between the bottom sheet and the die. The top sheet is layered above the bottom sheet and are disposed between a die and a blank holder. The barrier is configured to reduce stress concentrations during formation of a joint between the top sheet and the bottom sheet.

In various embodiments, the top sheet includes at least one of an aluminum layer, a magnesium layer, or a steel layer. In some embodiments, the bottom sheet includes at least one of an aluminum layer, a steel layer, or a magnesium layer. In various embodiments, the barrier is at least one of a cold formed or a dual phase steel. In some embodiments, the barrier has a thickness between approximately 0.8 mm and 1.00 mm. In some embodiments, at least one of the top sheet or the bottom sheet includes at least one of a polymeric, fibrous, or composite layer.

Another aspect of the present disclosure relates to a method for forming joints using self-piercing riveting (SPR). The method includes layering a first sheet atop a second sheet, placing a barrier between the second sheet and the die, and driving, by a punch disposed within the blank holder, a rivet into each of the first sheet and the second sheet to form a joint therebetween. The first sheet and the second sheet are disposed between a die and a blank holder. The barrier is configured to reduce stress concentrations during formation of a joint between the top sheet and the bottom sheet.

In various embodiments, the method further includes optimizing a setting force associated with the joint formation based on at least one of a thickness or yield strength associated with the barrier. In some embodiments, the method also includes clamping the first sheet to the second sheet. In other embodiments, the method further includes removing the barrier from between the second sheet and the die. In yet other embodiments, the bottom sheet includes an aluminum layer, magnesium layer, a plastic layer, a steel layer, or a fiber reinforced layer. In various embodiments, the barrier is at least one of a cold formed or a dual phase steel. In some embodiments, the top sheet includes an aluminum layer, magnesium layer, a plastic layer, a steel layer, or a fiber reinforced layer. In other embodiments, the top sheet includes an epoxy powder coating.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to self-piercing riveting (SPR) and forming joints using SPR technologies. Generally, SPR is distinguished from traditional riveting in that SPR does not require pre-drilling to facilitate insertion of a rivet. Instead, SPR methods use semi-tubular rivets that form a mechanical joint between two sheets by deforming and/or piercing the sheets such that the sheets become interlocked. Typically, the two sheets are layered (i.e., top and bottom) according a preferred arrangement, the sheets are clamped or otherwise affixed between a die and a blankholder, and a rivet is forced into the two sheets by a punch. The rivet pierces the upper sheet and is forced in to the second sheet, deforming both the top sheet and bottom sheet to form a protrusion ("button") on a bottom side of the two sheets as the rivet flares outward due to the shape and size of the die.

Figure 1:
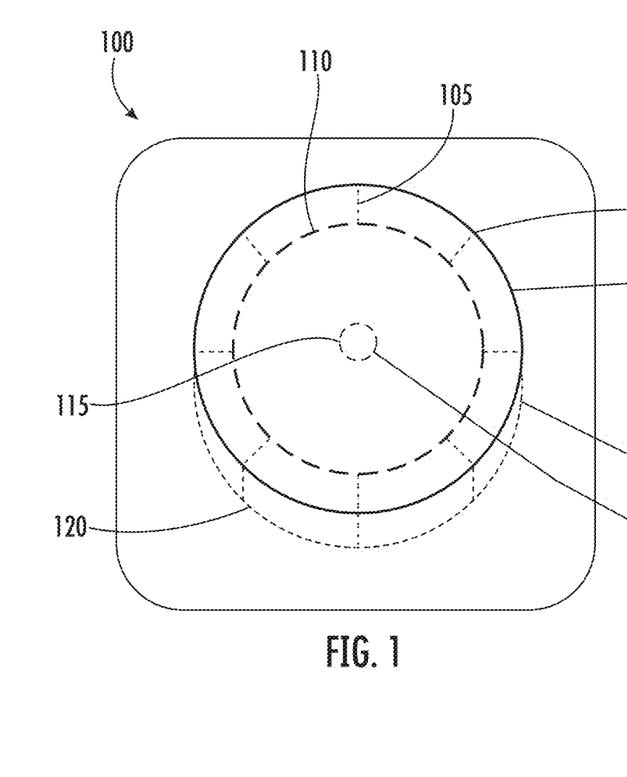
FIG. 1 is a schematic representation of various failure modes of SPR joints, according to an exemplary embodiment.
Figure 2A:
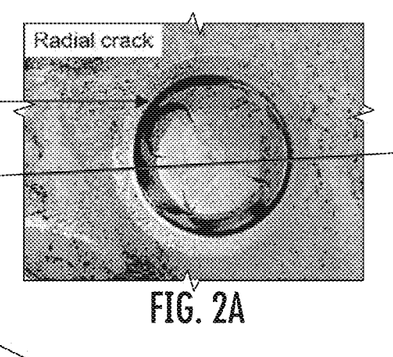
FIGS. 2A-2D are pictorial representations of the various failure modes of SPR joints shown in FIG. 1.
Figure 2B:
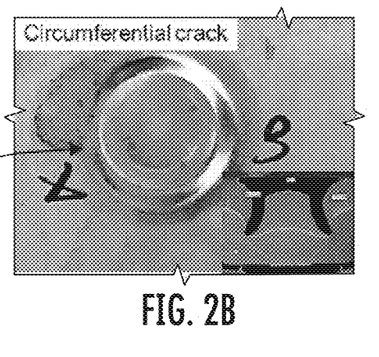
Figure 2C:
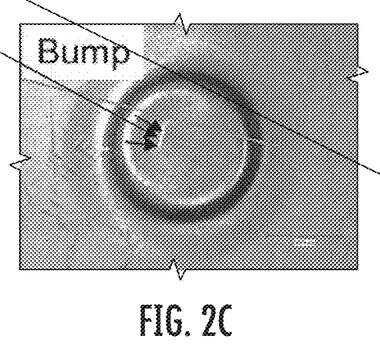
Figure 2D:
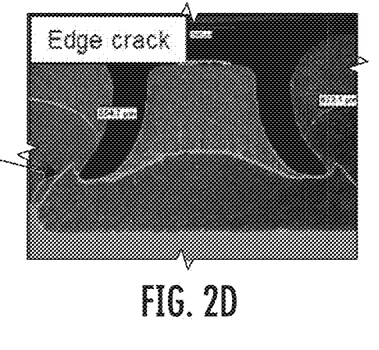

Generally, a quality of the joint formed between the two sheets can be characterized based on an amount of mechanical interlock between the top sheet and bottom sheet, as facilitated by flaring of the rivet. However, depending on a thickness of the sheets and/or mechanical properties of the material sheets, the formed joint may fail. FIGS. 1 and 2 show common failure modes associated with an SPR joint 100 ("button"). As shown, common failure modes for an SPR joint 100 include, but are not limited to, radial cracks 105 (i.e., cracks extending radially within the button) such as shown in FIG. 2A, circumferential cracks 110 (i.e., cracks formed around a circumference of the button) such as shown in FIG. 2B, bumps 115 such as shown in FIG. 2C, and edge cracks 120 (i.e., cracks extending outward from the rivet) such as shown in FIG. 2D. Due to the high speeds and high forces required to form an SPR joint, there can be excess energy in the form of bounce-back, which can cause failure of the SPR joint. Because failure of an SPR joint, from any failure mode, can be detrimental or even catastrophic to the assembly or structure that encompasses the SPR joint, it would be advantageous to provide a method or system for SPR that prevents joint failure.

Figure 3:
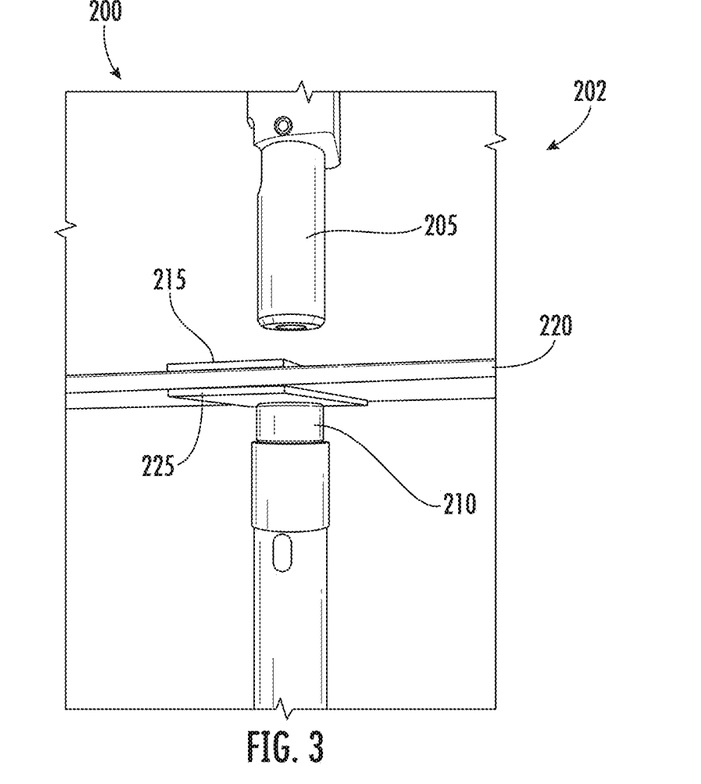
FIG. 3 is a front perspective view of an SPR fastening system, according to an exemplary embodiment.

According to an aspect of the present disclosure, an SPR method and/or system includes implementation of a sacrificial sheet to facilitate robust joint-forming with a variety of material types. Referring to FIG. 3, an SPR system 200 is shown, according to an exemplary embodiment. The SPR system 200 includes a c-frame 202 having a blankholder 205 and a die 210 (e.g., a forming die), which are configured to facilitate forming an SPR joint between two sheets of material. The c-frame 202 supports a top sheet 215 and a bottom sheet 220, which are layered atop the die 210 with a removable or sacrificial sheet or barrier ("pad") 225 disposed between the bottom sheet 220 and the die 210. The top and bottom sheets 215, 220 may be clamped, locked, or otherwise affixed in place using any methods known in the art.

Figure 4:
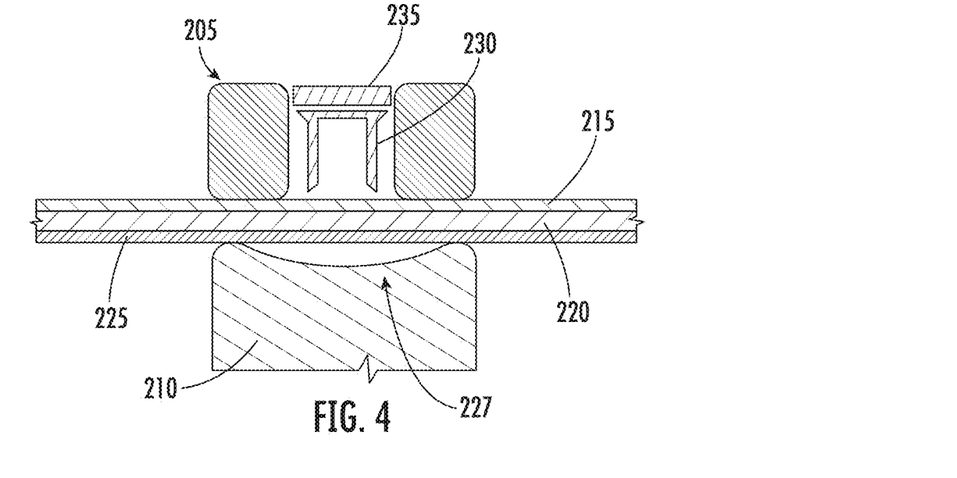
FIG. 4 is a schematic representation of a sectional view of the SPR fastening system of FIG. 3 near the portion of the top sheet and bottom sheet in contact with the die and the sheet holder.

FIG. 4 illustrates a schematic representation of a sectional view of the SPR system 200 near the die 210 shortly before joint formation between the top sheet 215 and the bottom sheet 220. As shown, the SPR system 200 includes a punch 235, which is disposed within and articulates relative to the blankholder 205. The punch 235 is configured to drive a rivet 230 through the top sheet 215 and into the bottom sheet 220 to form a joint therebetween. The joint formed may have a shape determined by an amount of flaring by the rivet 230, as caused by a shape or contoured feature 227 of the die 210. In various embodiments, at least one of the top sheet 215 or bottom sheet 220 may include one or more materials for high pressure die casting (HDPC). In various embodiments, at least one of the top sheet 215 or bottom sheet 220 may include at least one of steel (e.g., mild steel, AHSS), aluminum (e.g., HPDC, 5xxx series, 6xxx series, fiber reinforced), magnesium (e.g., Mg HPDC, extruded), or a combination thereof. In various embodiments, at least one of the top sheet 215 and the bottom sheet 220 may be a coated material. In at least one embodiment, at least one of the top sheet 215 or the bottom sheet 220 includes a polymeric (e.g., plastic or reinforced plastic), fibrous (e.g., fiber reinforced), and/or composite material.

The barrier 225 is a layer configured to reduce stress concentrations during formation of an SPR joint. Specifically, the barrier 225 is disposed between the bottom sheet 220 and the die 210 such that as the punch 235 drives the rivet 230 into the top sheet 215 and bottom sheet 220, the barrier 225 reduces stress concentrations caused by contact between the punch 235 and rivet 230, thereby preventing bounce back and reducing risk of failure of the resulting SPR joint between the top sheet 215 and bottom sheet 220. The barrier 225 may include or be a mild steel (e.g., CR3) and/or a high strength steel (e.g., DP600). In other embodiments, the barrier 225 may include one or more other metallic alloys. In yet other embodiments, the barrier 225 may include one or more aluminum alloys. In some embodiments, the barrier 225 may include one or more polymeric, fibrous, and/or composite materials. In some embodiments, the barrier 225 may include one or more materials having a yield strength that is chosen based on one or more characteristics of the top sheet 215 and/or bottom sheet 220. In various embodiments, the top sheet 215 may have a thickness that is less than 3 mm. In some embodiments, the bottom sheet 220 may have a thickness ranging from about 2 mm to 5 mm. In various embodiments, a thickness of the barrier 225 may be based on a combined thickness of the top sheet 215 and bottom sheet 220. In various embodiments, the thickness of the barrier 225 may range from about 0.8 mm to 1.0 mm. In other embodiments, the thickness of the barrier 225 may range from approximately 0.5 mm to approximately 2 mm. In yet other embodiments, the barrier 225 may include or be DP600 steel having a thickness of approximately 1 mm and may be used to with a bottom sheet 220 made of a magnesium alloy (e.g., AM60B) having a thickness of approximately 3.2 mm, and a top sheet 215 made of chromium grade steel (e.g., 410T), where the top sheet 215 may have a thickness of approximately 1.2 mm, 1.5 mm, or 2.7 mm. In other embodiments, the barrier 225 may include or be chromium grade steel (e.g., 410T) having a thickness of approximately 1.5 mm and may be used to with a bottom sheet 220 made of a magnesium alloy (e.g., AM60B) with a thickness of approximately 3.2 mm, and a top sheet 215 made of a graphite series steel (e.g., 780T), where the top sheet 215 may have a thickness of approximately 1.6 mm.

After formation of the SPR joint between the top sheet 215 and the bottom sheet 220, the barrier 225 may be discarded or reused during formation of other SPR joints. In various embodiment, the barrier 225 may be clamped or otherwise coupled to at least one of the top sheet 215 and the bottom sheet 220 during formation of the SPR joint and removed afterward. In various embodiments, the barrier 225 may be sized based on a size (i.e., length and width) of the SPR joint, a thickness of at least one of the top sheet 215 or bottom sheet 220, a size of a top surface of the SPR die, and/or a mechanical property of at least one of the top sheet 215 or bottom sheet 220. In some embodiments, the barrier 225 may be approximately 4 inches in width and 6 inches in length.

In at least one embodiment, at least one of the top sheet 215 or the bottom sheet 220 includes at least one of a steel or aluminum material layer. In various embodiments, the steel layer(s) may have various different compositions. The steel layer(s) may have a variety of different compositions. For example, in one embodiment, the steel may be a low carbon steel having iron alloyed with about 0.25 weight percent ("wt. %") carbon. In another embodiment, the steel may be a high carbon steel having iron alloyed with up to about 2.5 wt. % carbon. In other embodiments, the steel may be a stainless steel having iron alloyed with chromium and nickel. In yet other embodiments, the steel may include at least one of iron, carbon, manganese, chromium, nickel, tungsten, molybdenum, boron, titanium, vanadium, cobalt, niobium, or a combination thereof. For example, the steel layer may include a CR3 steel (i.e., which includes about 0.10% carbon (C), about 0.45% manganese (Mn), up to 0.03% sulfur (S), up to 0.04% phosphorus (P), balance iron (Fe), and trace impurities), a CR2 steel, a ferrite-martensite dual phase (DP) 600 steel (i.e., which includes about 0.10% carbon (C), about 1.4% manganese (Mn), about 0.14% silicon (Si), balance iron (Fe), and trace impurities), galfan (GF) steel and/or cold formed (CF) steel composite, advanced high strength (AHSS) steel, and/or another steel or steel alloy.

In various embodiments, the aluminum layer(s) may include at least one of an aluminum casting, extrusion, or similar. In various embodiments, the aluminum layer may include at least one of a 1000 series, 2000 series, 3000 series, 4000 series, 5000 series, 6000 series, 7000 series, or 8000 series aluminum alloy. In such embodiments, the 1000 series aluminum alloy (i.e. 1050, 1060, 1070, 1100, 1145, 1199, 1350, etc.) is substantially pure aluminum with a minimum 99 wt % aluminum content and may be work hardened. The 2000 series aluminum alloy (i.e. 2011, 2014, 2024, 2036, 2048, 2090, 2091, 2099, 2124, 2195, 2218, 2219, 2319, 2618, etc.) is alloyed with copper and may be precipitation hardened to strengths comparable to steel. The 3000 series aluminum alloy (i.e. 3003, 3004, 3005, 3102, 3103, 3105, 3303, etc.) is alloyed with manganese and may be work hardened. The 4000 series aluminum alloy (i.e. 4006, 4007, 4015, 4032, 4043, etc.) is alloyed with silicon. The 5000 series aluminum alloy (i.e. 5005, 5010, 5019, 5026, 5050, 5052, 5056, 5059, 5083, 5086, 5154, 5182, 5252, 5254, 5356, 5454, 5456, 5457, 5652, 5657, 5754, Al3Mg, etc.) is alloyed with magnesium and offer enhanced corrosion resistance. The 6000 series aluminum alloy (i.e. 6005, 6009, 6010, 6060, 6061, 6063, 6063A, 6065, 6066, 6070, 6081, 6082, 6101, 6105, 6151, 6162, 6201, 6205, 6262, 6351, 6463, etc.) is alloyed with magnesium and silicon and is machinable, weldable, and may be precipitation hardened. The 7000 series aluminum alloy (i.e. 7005, 7039, 7049, 7050, 7068, 7072, 7075, 7079, 7116, 7129, 7175, 7178, 7475, etc.) is alloyed with zinc and may be precipitation hardened to the highest strengths of any aluminum alloy, with a tensile strength up to 700 MPa. The 8000 series aluminum alloy (i.e. 8011, 8090, etc.) is alloyed with elements which are not covered by 1000-7000 series aluminum alloys.

In at least one embodiment, at least one of the top sheet 215 or the bottom sheet 220 includes a magnesium casting, magnesium extrusion, magnesium sheet, a magnesium alloy, or another magnesium layer. The magnesium alloy may include, but is not limited to AE42, AE44, AM20, AM40, AM50, AM60, AM60B, AS21, AS41, AZ31, AZ61, AZ63, AZ80, AZ81, AZ91, Elektron 21, Elektron 675, EZ33, HK31, HM21, HZ32, K1A, LA141, LA103, LAZ43, M1, M1A, QE22, QH21, WE43, WE54, ZC63, ZC71, ZE41, ZK10, ZK20, ZK30, ZK40, ZK51, ZK60, ZK61, ZM21, ZMC711, any alloys with magnesium contents of 80% of higher, or a combination thereof. In various embodiments, the magnesium layer may include AM60B magnesium alloy, which includes about 5.5-6.5% aluminum (Al), about 0.24-0.6% manganese (Mn), at most about 0.22% zinc (Zn), at most about 0.1% silicon (Si), at most about 0.01% copper (Cu), at most about 0.005% iron (Fe), at most about 0.002% nickel (Ni), balance magnesium (Mg), and trace impurities. In yet other embodiments, the magnesium layer may be coated using an electrophoretic coating and/or a powder coat (e.g., N49).

Figure 5:
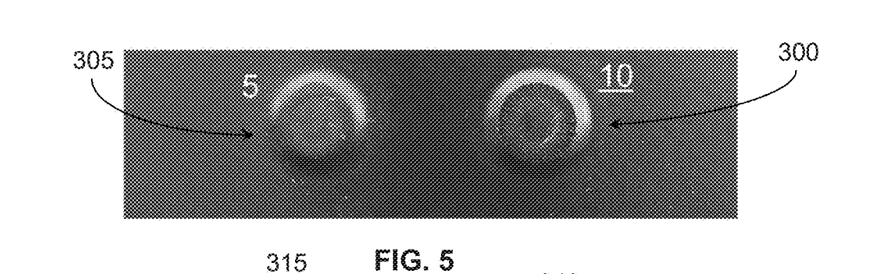
FIG. 5 is a bottom view of SPR joints formed between a top sheet and a bottom sheet using a first die geometry with and without a barrier layer.
Figure 6:
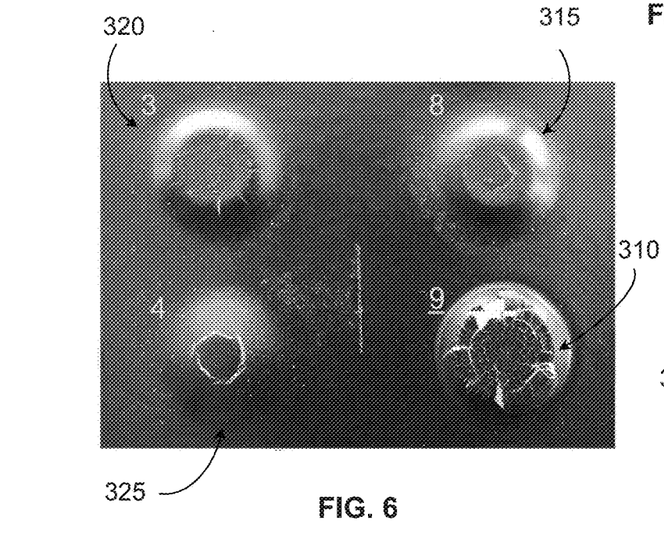
FIG. 6 is a bottom view of SPR joints formed between a top sheet and a bottom sheet using a second die geometry with and without a barrier layer.
Figure 7:
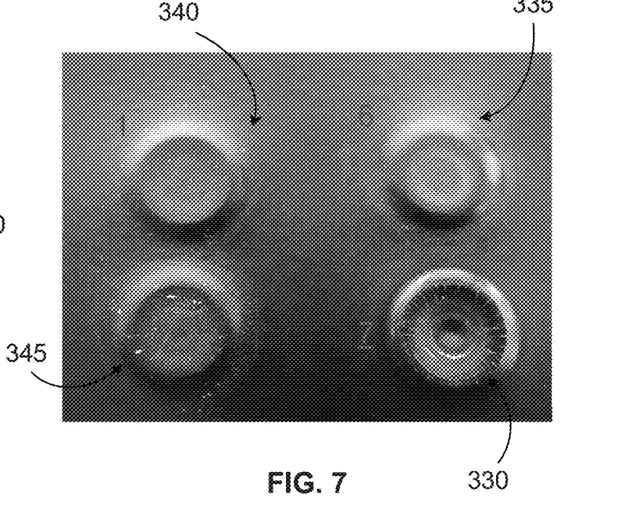
FIG. 7 is a bottom view of SPR joints formed between a top sheet and a bottom sheet using a third die geometry with and without a barrier layer.

Evidence of the efficacy of a barrier (e.g., similar or equivalent to the barrier 225) during SPR joint formation is illustrated in FIGS. 5-7. As shown, use of a barrier has been shown to improve joints formed between two material sheets using various different dies. FIG. 5 shows a first SPR joint 300 formed between two layers using a first die (e.g., forming die) and without a barrier. FIG. 5 also shows a second SPR joint 205 formed between two layers using the first die and formed with a barrier. As illustrated, the SPR joint 305 formed with the barrier shows fewer signs of circumferential cracking and bumps.

Barrier efficacy has been shown over varying thicknesses, as shown in FIGS. 6 and 7. Referring specifically to FIG. 6, an SPR joint 310 formed without a barrier is shown in comparison to SPR joints 315, 320, and 325, which were formed the barrier. Each of the SPR joints 310, 15, 320, and 325 were formed using a second die (i.e., different than the first die used to form SPR joints 300 and 305). As illustrated, the SPR joint 310 formed in the absence of the barrier shows a high degree of radial and circumferential cracking, which detrimentally affect the structural soundness of the formed joint. However, as shown, the SPR joints 315, 320, and 325, which were formed using a barrier disposed between the material layers and the second die, show significantly fewer cracks, bumps, or other readily apparent evidence of failure. The SPR joint 315 was formed using a barrier having a first thickness, the SPR joint 320 was formed using a barrier having a second thickness, and the SPR joint 325 was formed using a barrier having a third thickness. In various implementations, at least one of the first thickness or the second thickness ranged from approximately 2 mm to approximately 4 mm. As illustrated, use of barrier during joint formation reduces cracking compared to joint formation in the absence of a barrier.

FIG. 7 similarly illustrates efficacy of using a barrier (e.g., similar or equivalent to the barrier 225) during formation of SPR joints using a third die (i.e., a die different than each of the first die used to form SPR joints 300, 305 and the second die used to form the SPR joints 310, 315, 320, 325). As shown, the SPR joint 330 formed in the absence of a barrier results in a joint having more bumps and cracks compared to SPR joints 335, 340, and 345, which are each formed with barrier. The SPR joint 335 was formed using a barrier having a first thickness, the SPR joint 340 was formed using a barrier having a second thickness, and the SPR joint 345 was formed using a barrier having a third thickness. In various implementations, at least one of the first thickness or the second thickness ranged from approximately 2 mm to approximately 4 mm. Accordingly, as shown in FIGS. 6-7 use of a barrier, even at varying thicknesses, can prevent various failure modes associated with SPR joints formed in the absence of the barrier (i.e., SPR joints 310, 330).

Figure 8:
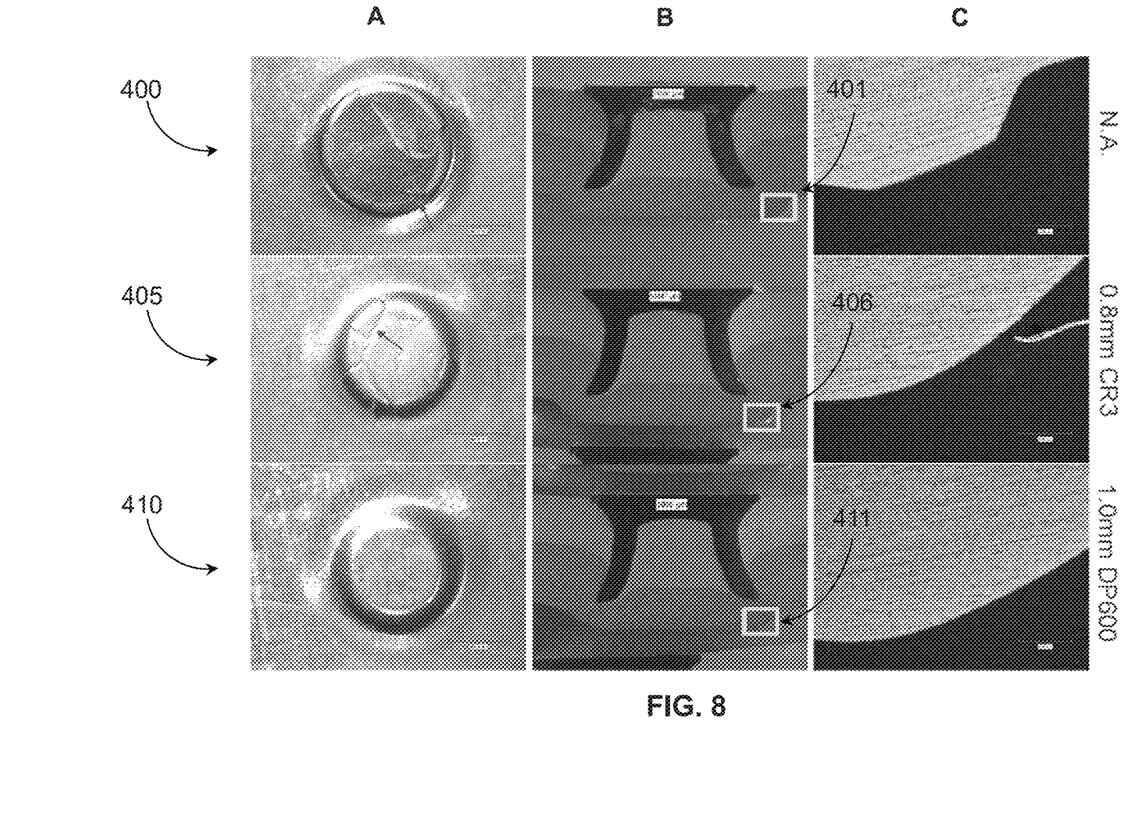
FIG. 8 shows bottom and cross-sectional views of SPR joints formed between a top sheet and a bottom sheet using a first sheet material with and without a barrier.
Figure 9:
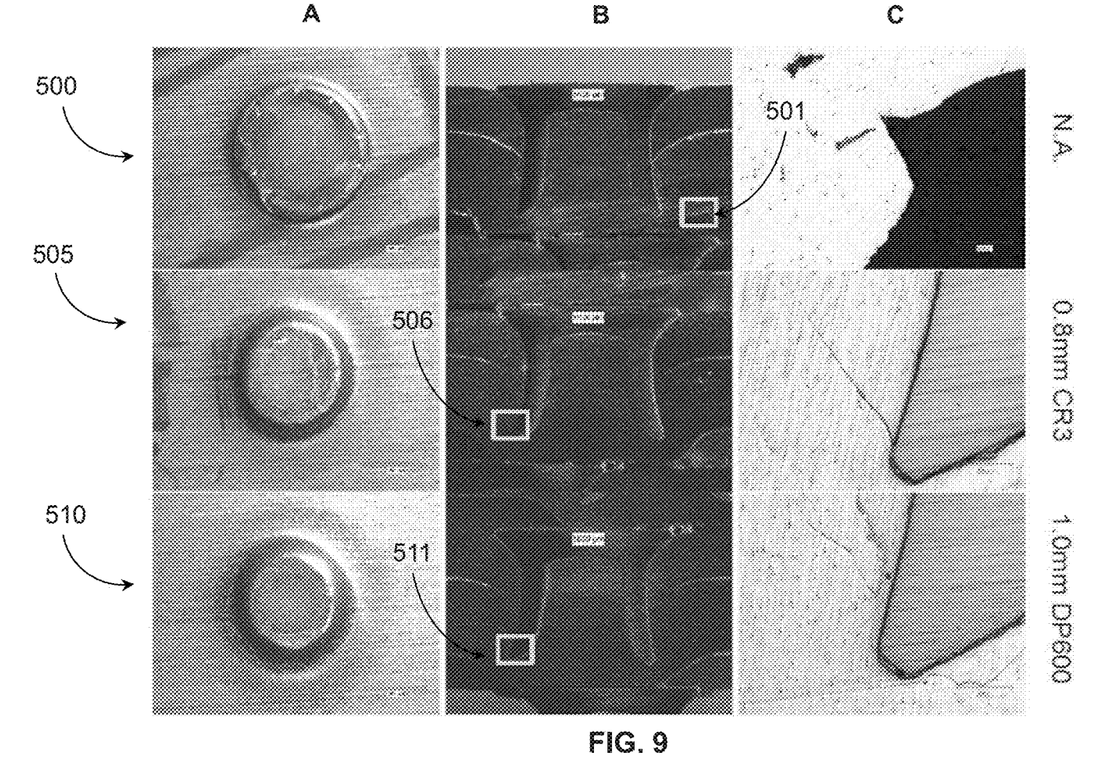
FIG. 9 shows bottom and cross-sectional views of SPR joints formed between a top sheet and a bottom sheet using a second sheet material with and without a barrier.
Figure 10:
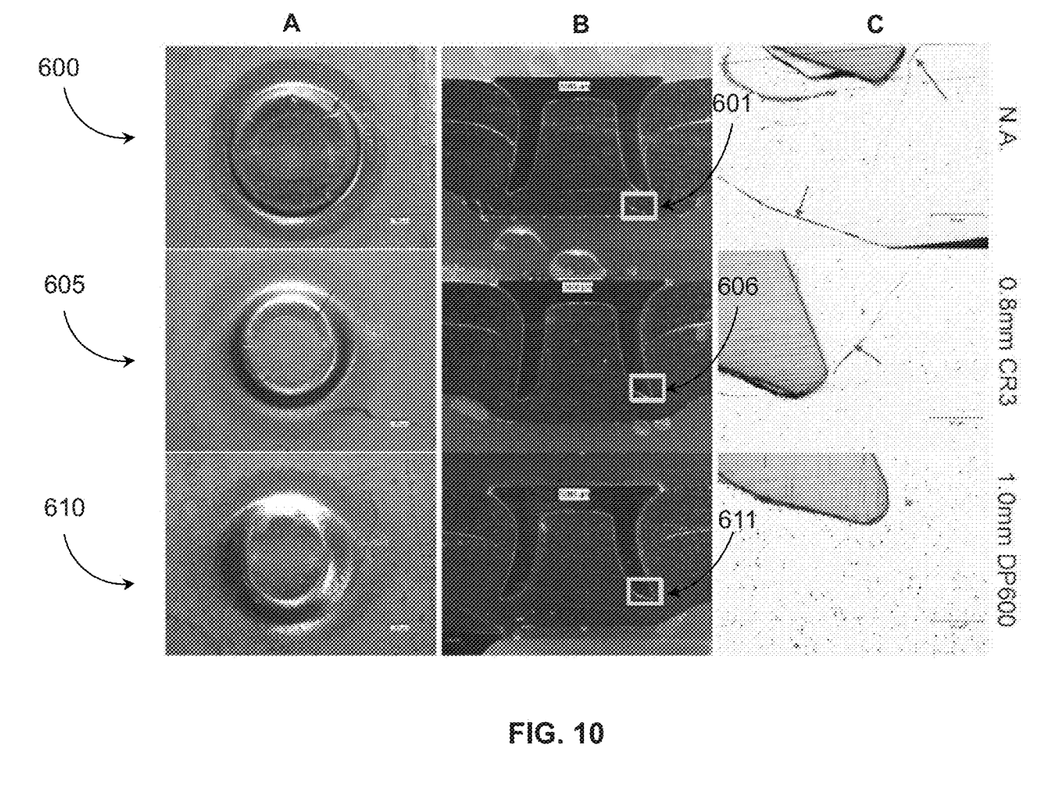
FIG. 10 shows bottom and cross-sectional views of SPR joints formed between a top sheet and a bottom sheet using a third sheet material with and without a barrier.

FIGS. 8-10 illustrate SPR joints formed with and without a barrier (e.g., similar or equivalent to the barrier 225). As previously described, the barrier may include cold rolled (e.g., CR3) or dual-phase steel (e.g., DP600). Sheet material used to form SPR joints may include aluminum, magnesium, and/or steel. FIG. 8 shows bottom and cross-sectional views of SPR joints 400, 405, and 415. Specifically, column A shows bottom views, column B shows cross-sectional views, and column C shows a magnification of a portion of the corresponding cross-section shown in column B near an outer edge of the SPR joint. The SPR joints 400, 405, and 410 are formed between 6xxx series aluminum (top layer) and high-pressure die-cast aluminum (bottom layer). SPR joint 400 is formed in the absence of a barrier and shows evidence of circumferentially formed bumps and cracks. As shown in a magnification of a portion 401 presented in column C, the SPR joint 400 is ridged and uneven within an outer region of the SPR joint 400. As illustrated, the SPR joint 405, which was formed using a barrier made of CR3 steel with a thickness of 0.8 mm, has fewer bumps and a significantly smoother outer edge as compared to the SPR joint 400. Similarly, the SPR joint 410, which was formed using a barrier made of DP600 steel with a thickness of 1.0 mm, has a smooth surface in both radial and circumferential directions as compared to the SPR joint 400. Furthermore, magnifications of cross-sectional portions 406 and 411 of the SPR joints 405 and 410, respectively, illustrate non-ridged, smooth outer edges with little to no evidence of cracking.

Use of the barrier in SPR joint formation has proven effective with materials having reduced formability (i.e., reduced formability as compared to steel and/or aluminum, for example). FIG. 9 shows bottom and cross-sectional views of SPR joints 500, 505, and 515. The SPR joints 500, 505, and 510 are formed between an HPDC magnesium alloy (top layer) and an extruded magnesium alloy (bottom layer). Specifically, column A shows bottom views, column B shows cross-sectional views, and column C shows a magnification of a portion of the corresponding cross-section shown in column B near an outer edge of the SPR joint. SPR joint 400 is formed in the absence of a barrier and shows evidence of circumferentially formed bumps and cracks. As shown in a magnification of a portion 501 presented in column C, the SPR joint 500 is significantly cracked, evidenced by large asperities within the outer region of the bottom material layer. The SPR joint 405, which was formed using a barrier made of CR3 steel with a thickness of 0.8 mm, has notably fewer cracks and a smoother outer edge as compared to the SPR joint 500. Furthermore, magnification of the portion 506 within the cross-section of SPR joint 505 shows fewer edge cracks compared to the SPR joint 505. Similarly, the SPR joint 510, which was formed using a barrier made of DP600 steel with a thickness of 1.0 mm, has a smooth surface in both radial and circumferential directions as compared to the SPR joint 500. Magnifications of cross-sectional portion 511 of the SPR joint 510 also show very little edge cracking in comparison to both the SPR joint 500 and 505.

FIG. 10 shows bottom and cross-sectional views of SPR joints 600, 605, and 615. The SPR joints 600, 605, and 610 are formed between a formed magnesium sheet (top layer) and an HPDC magnesium allow (bottom layer). As noted previously, column A shows bottom views, column B shows cross-sectional views, and column C shows a magnification of a portion of the corresponding cross-section shown in column B near an outer edge of the SPR joint. The SPR joint 600 is formed in the absence of a barrier and shows evidence of both radial cracks and prominent bumps in both radially inner and outer regions of the SPR joint 600. In addition, magnification of the cross-sectional portion 601 shown in column C shows that the SPR joint 600 is uneven and has extensive edge cracking adjacent an outer region of the SPR joint 600. However, SPR joint 605, which was formed using a barrier made of CR3 steel with a thickness of 0.8 mm, has fewer radial cracks and bumps as compared to the SPR joint 600. In addition, the SPR joint 605 has fewer edge cracks compared to the SPR joint 600, as evident from column C, which shows a magnification of cross-sectional portion 506. The SPR joint 610, which was formed using a barrier made of DP600 steel with a thickness of 1.0 mm, has a smooth outer surface with little radial cracking and little to no visible bumps. In addition, magnification of the cross-sectional portion 611 shows there is little to no edge cracking surrounding the SPR joint 610.

Figure 11:
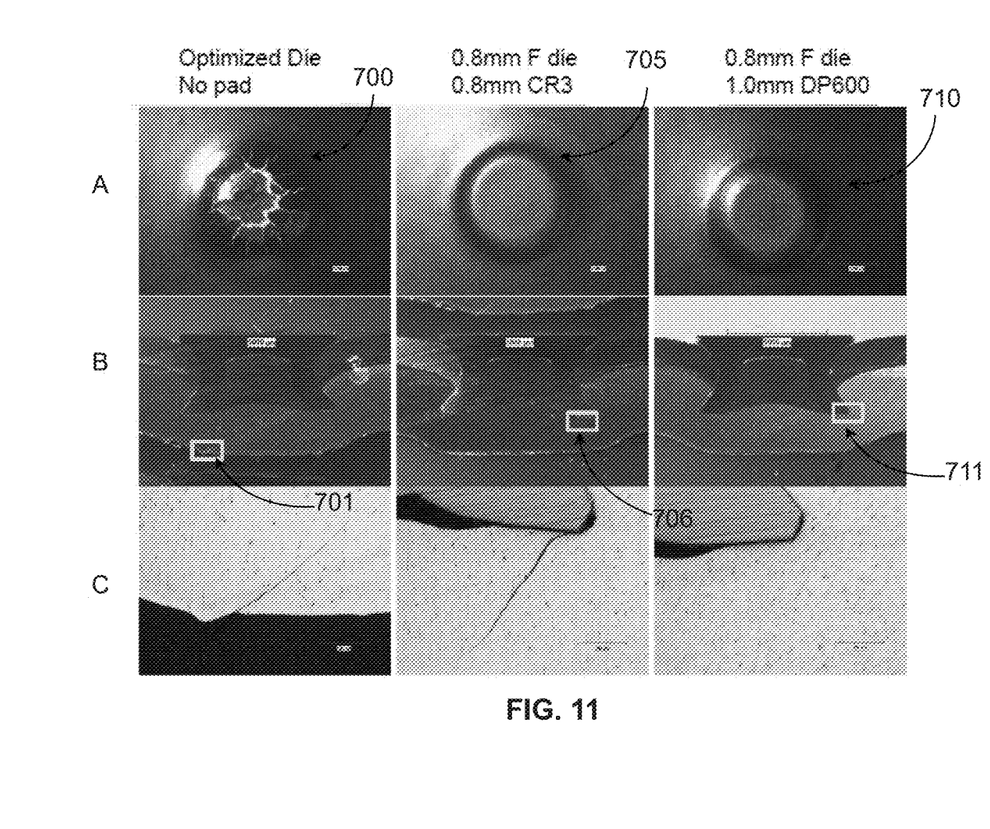
FIG. 11 shows bottom and cross-sectional views of SPR joints formed between a top sheet and a bottom sheet using a coated material layer.

Use of a barrier in SPR joint formation has proven effective despite when used in the formation of SPR joints including coated material layers. FIG. 11 shows bottom and cross-sectional views of SPR joints 700, 705, and 715. The SPR joints 700, 705, and 710 are formed between a mild steel alloy (top layer) and an epoxy powder-coated magnesium alloy (bottom layer). The epoxy powder coat is applied to a die-oriented side of the bottom layer. Row A of FIG. 11 shows bottom views, row B shows cross-sectional views, and row C shows a magnification of a portion of the corresponding cross-section shown in column B near an outer edge of the SPR joint. The SPR joint 700 is formed in the absence of a barrier and includes radially extending cracks within the coating and bottom layer, which is also shown in a magnification of a portion 701 presented in row C. The SPR joint 705, which was formed using a barrier made of CR3 steel with a thickness of 0.8 mm, has few perceivable cracks within the bottom surface and has a generally smoother outer edge as compared to the SPR joint 700. Magnification of the portion 706 within the cross-section of SPR joint 705 mild edge cracking. The SPR joint 710, which was formed using a barrier made of DP600 steel with a thickness of 1.0 mm, has a smooth surface in both radial and circumferential directions as compared to the SPR joint 700. Magnifications of cross-sectional portion 711 of the SPR joint 710 also show little edge cracking in comparison to both the SPR joint 500 and 505.

Figure 12:
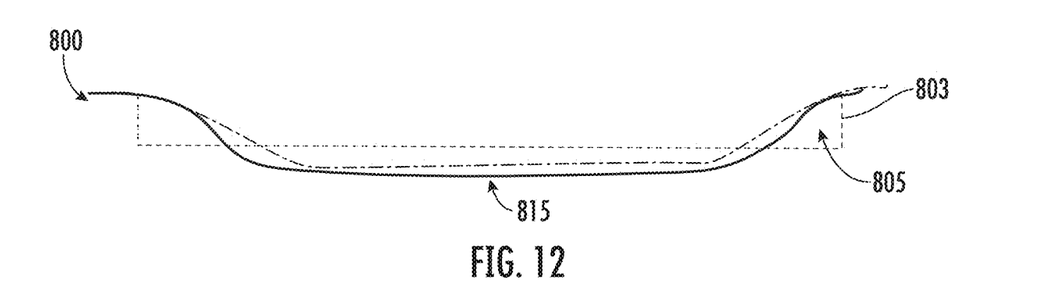
FIG. 12 is a schematic representation of a cross-sectional view of an SPR joint, according to an exemplary embodiment.

Finally, SPR joint structural soundness is not only based on an absence of various failure modes, but is also dependent on setting of the material layers within the rivet. FIG. 12 shows a schematic representation of a cross-sectional view of an SPR joint 800 formed within a rivet 803. The SPR joint 800 includes an outer region 805 (i.e., disposed along a circumference of the SPR joint 800) and an inner region 815 (i.e., disposed within an inner circumference or radius of the SPR joint 800). Generally speaking it is advantageous for the outer regions 805 and the inner region 810 conform to a contour defined by the rivet 803. The amount of conformity or setting force of various SPR joints formed using various barriers of different materials and thicknesses have been experimentally determined. The results of such experimentation is provided below in Table 1. In the summarized experiment, SPR joints were formed from a top layer made from a mild steel (CR3) having a 0.8 mm thickness, a bottom layer made from a magnesium alloy (AM60) having a 3.1 mm thickness, and a 5 mm rivet (H4).

TABLE 1

| Barrier Material | Yield Strength (MPa) | Barrier Thickness (mm) | Setting force (kN) |
|---|---|---|---|
| 0.9 mm 6061-T4 | 110 | 4.90 | 54.01 |
| 2 × 0.9 mm 6061-T4 | 110 | 5.80 | 56.72 |
| 0.8 mm CR3 | 180 | 4.80 | 53.11 |
| 2 × 08 mm CR3 | 180 | 5.60 | 53.28 |
| 1.0 mm DP600 | 310 | 5.00 | 55.16 |
| 2 × 1.0 mm DP600 | 310 | 6.00 | 57.7 |
| 1.7 mm DP800 | 530 | 5.70 | 61.83 |
| 2.0 mm AM60 | 120 | 6.00 | 49.18 |
| 2.0 mm 6061-T6 | 276 | 6.00 | 54.65 |

Figure 13:
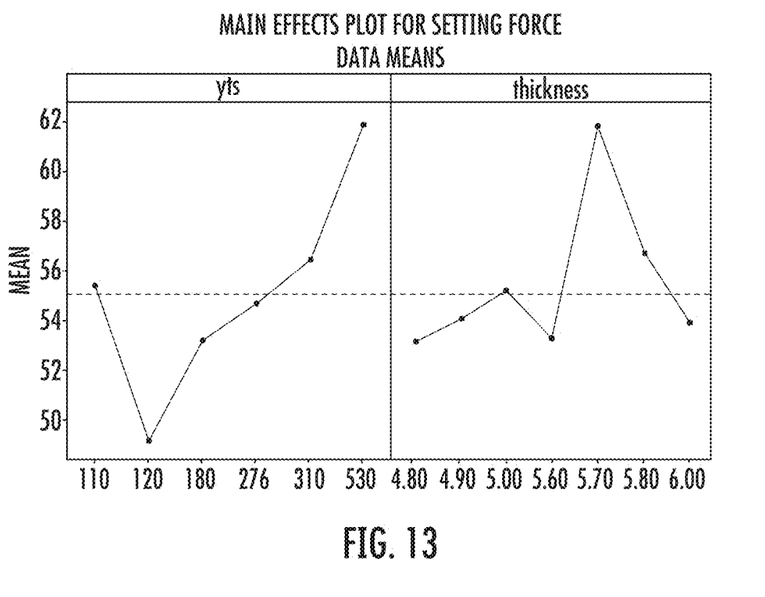
FIG. 13 is a graphical representation of SPR joint setting force versus barrier yield strength and thickness.

As shown in FIG. 13, setting force (shown on vertical axis) generally increases with increase yield strength of the barrier used during SPR joint formation. However, setting force was comparably lower with both the thinnest and thickest barriers used during SPR joint formation. Accordingly, in practice, at least one of the barrier material (and thus, barrier yield strength) or the barrier thickness can be optimized based on a desired setting force for SPR joint formation. In some implementations, SPR joint formation may be carried out using a barrier having a comparably high yield strength with a relatively small thickness. In some implementations, the barrier may have a yield strength that is greater than or equal to approximately 200 MPa and has a thickness that is between approximately 0.5 mm to approximately 2.0 mm. In various implementations, selection of the barrier material is based on at least one of the setting force, the bottom sheet material, the top sheet material, or the die profile. Generally, the barrier material is selected such that it is sufficiently ductile deforms to conform to the die cavity and having a hardness that does not affect coatings of either the top sheet or bottom sheet. In various implementations, a thickness of the barrier may be minimized. In some implementations, the barrier may have a thickness that is between approximately 0.6 mm and approximately 1.0 mm. In other implementations, the barrier thickness may be up to 2.0 mm.

Notwithstanding the embodiments described above in FIGS. 1-13, various modifications and inclusions to those embodiments are contemplated and considered within the scope of the present disclosure.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the elements of the SPR joint as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Although the figures and description may illustrate a specific order of method steps, the order of such steps may differ from what is depicted and described, unless specified differently above. Also, two or more steps may be performed concurrently or with partial concurrence, unless specified differently above.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method for forming joints using self-piercing riveting (SPR), the method comprising:
    layering a first sheet atop a second sheet, wherein the first sheet and the second sheet are disposed between a die and a blank holder;
    placing a barrier between the second sheet and the die;
    driving, by a punch disposed within the blank holder, a rivet into each of the first sheet and the second sheet to form a joint therebetween;
    wherein the barrier is configured to reduce stress concentrations during formation of a joint between the top sheet and the bottom sheet; and removing the barrier from between the second sheet and the die, after driving the rivet into each of the first sheet and the second sheet.

2. The method of claim 1, further comprising optimizing a setting force associated with the joint formation based on at least one of a thickness or yield strength associated with the barrier.

3. The method of claim 1, further comprising clamping the first sheet to the second sheet.

4. The method of claim 1, wherein the second sheet comprises an aluminum layer, magnesium layer, a plastic layer, a steel layer, or a fiber reinforced layer.

5. The method of claim 1, wherein the barrier is at least one of a cold formed or a dual phase steel.

6. The method of claim 1, wherein the first sheet comprises an aluminum layer, magnesium layer, a plastic layer, a steel layer, or a fiber reinforced layer.

7. The method of claim 1, wherein the first sheet comprises an epoxy powder coating.

8. The method of claim 1, wherein the barrier comprises an aluminum alloy.

9. The method of claim 1, wherein the barrier has a yield strength greater than or equal to 200 MPa.

10. The method of claim 1, wherein the barrier has a yield strength of 110 MPa.

11. The method of claim 1, wherein the barrier has a thickness between 0.5 mm and 2.0 mm.

12. The method of claim 11, wherein the barrier comprises at least one of a polymeric or fibrous material.

13. The method of claim 1, wherein the barrier comprises a composite material.

14. The method of claim 1, further comprising reusing the barrier to form a second joint.

15. The method of claim 1, wherein the barrier has a length of approximately 6 inches and a width of approximately 4 inches.

* * * * *